(12) United States Patent
Kang et al.

(10) Patent No.: US 10,808,088 B2
(45) Date of Patent: Oct. 20, 2020

(54) THERMOPLASTIC COMPOSITE, METHOD FOR PREPARING THERMOPLASTIC COMPOSITE, AND PANEL

(71) Applicant: LG Hausys, Ltd., Seoul (KR)

(72) Inventors: Kyoung-Min Kang, Seoul (KR); Sung-Yong Kang, Anyang-si (KR); Min-Gyung Kim, Anyang-si (KR); Chang-Young Park, Anyang-si (KR); Jae-Ho Lim, Chungju-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 16/337,088

(22) PCT Filed: Jun. 21, 2017

(86) PCT No.: PCT/KR2017/006531
§ 371 (c)(1),
(2) Date: Mar. 27, 2019

(87) PCT Pub. No.: WO2018/062667
PCT Pub. Date: Apr. 5, 2018

(65) Prior Publication Data
US 2020/0032012 A1 Jan. 30, 2020

(30) Foreign Application Priority Data

Sep. 29, 2016 (KR) .................. 10-2016-0125218

(51) Int. Cl.
*C08J 5/10* (2006.01)
*B29C 70/30* (2006.01)
(Continued)

(52) U.S. Cl.
CPC .................. *C08J 5/10* (2013.01); *B29C 70/30* (2013.01); *B32B 5/024* (2013.01); *B32B 5/12* (2013.01);
(Continued)

(58) Field of Classification Search
CPC ....... B29C 70/64; B29C 70/60; B29C 70/465; B29C 70/506; C08J 5/10
See application file for complete search history.

(56) References Cited

U.S. PATENT DOCUMENTS 3,870,590 A * 3/1975 Hurwitz ................. D06M 11/45
442/108
3,981,957 A * 9/1976 Van Brederode ........ C08J 3/122
264/12

(Continued)

FOREIGN PATENT DOCUMENTS

FR 2851566 A1 8/2004
JP 2006524270 A 10/2006
(Continued)

OTHER PUBLICATIONS

Anonymous, "Horiba Scientific, A Guidebook to Particle Size Analysis", Jan. 1, 2012, pp. 1-32, Irvine, CA 92618.
(Continued)

*Primary Examiner* — Matthew J Daniels
(74) *Attorney, Agent, or Firm* — Hauptman Ham, LLP

(57) ABSTRACT

Provided are a thermoplastic composite and a preparation method therefor, the composite comprising: a fiber structure having a network structure comprising at least one layer of fiber woven sheet; thermoplastic resin particles having a particle diameter of 1-50 μm; and a particulate flame retardant, wherein the thermoplastic resin particles and the particulate flame retardant are impregnated into the fiber structure. In addition, a panel comprising a thermo-compressed product of the thermoplastic composite is provided.

4 Claims, 1 Drawing Sheet

(51) Int. Cl.
  *B32B 5/02*  (2006.01)
  *B32B 5/12*  (2006.01)
  *B32B 5/26*  (2006.01)
  *C08J 3/20*  (2006.01)
  *C08J 5/04*  (2006.01)
  *B29K 101/12*  (2006.01)
  *B29K 105/08*  (2006.01)
  *B29L 7/00*  (2006.01)

(52) U.S. Cl.
  CPC ............... *B32B 5/26* (2013.01); *C08J 3/203* (2013.01); *C08J 5/043* (2013.01); *B29K 2101/12* (2013.01); *B29K 2105/0845* (2013.01); *B29L 2007/002* (2013.01); *B32B 2307/3065* (2013.01); *C08J 2323/12* (2013.01)

(56) References Cited

U.S. PATENT DOCUMENTS

| | | | | |
|---|---|---|---|---|
| 4,990,368 | A * | 2/1991 | Johnson | C09K 21/12 427/190 |
| 6,488,773 | B1 * | 12/2002 | Ehrhardt | B05B 7/0807 118/302 |
| 7,045,203 | B2 * | 5/2006 | Christou | C08K 9/08 264/332 |
| 2003/0034482 | A1 * | 2/2003 | Kinoshita | C09K 21/12 252/601 |
| 2003/0193045 | A1 * | 10/2003 | Takeuchi | C07F 9/5537 252/601 |
| 2004/0197539 | A1 | 10/2004 | Christou | |
| 2005/0250879 | A1 * | 11/2005 | Correll | C08K 3/01 523/221 |
| 2009/0029612 | A1 * | 1/2009 | Tsuji | B29C 70/22 442/59 |
| 2009/0155584 | A1 | 6/2009 | Rolland et al. | |
| 2014/0034191 | A1 | 2/2014 | Bonner | |
| 2014/0322504 | A1 | 10/2014 | Narimatsu et al. | |
| 2015/0336335 | A1 | 11/2015 | Okawa et al. | |
| 2016/0289405 | A1 | 10/2016 | Minami et al. | |

FOREIGN PATENT DOCUMENTS

| | | |
|---|---|---|
| JP | 2012-036295 A | 2/2012 |
| JP | 2015-098532 A | 5/2015 |
| JP | 5967084 B2 | 8/2016 |
| KR | 10-2015-0126517 A | 11/2015 |
| KR | 10-1642616 B1 | 7/2016 |
| WO | 2014-109021 A1 | 1/2017 |

OTHER PUBLICATIONS

Extended European Search Report dated Aug. 22, 2019, in connection with counterpart European Patent Application No. 17856553.7.
International Search Report dated Sep. 20, 2017, corresponding to International Application No. PCT/KR2017/006531.

\* cited by examiner

THERMOPLASTIC COMPOSITE, METHOD FOR PREPARING THERMOPLASTIC COMPOSITE, AND PANEL

CROSS REFERENCE TO RELATED APPLICATIONS

This present application is a national stage filing under 35 U.S.C § 371 of PCT application number PCT/KR2017/006531 filed on Jun. 21, 2017 which is based upon and claims the benefit of priority to Korean Patent Application No. 10-2016-0125218 filed on Sep. 29, 2016 in the Korean Intellectual Property Office. The disclosures of the above-listed applications are hereby incorporated by reference herein in their entirety.

TECHNICAL FIELD

The present disclosure relates to a thermoplastic composite material that is applicable to interior and exterior materials for a building, a vehicle, a filter, and the like and parts, a method for manufacturing the same and a panel manufactured from the thermoplastic composite material.

BACKGROUND ART

Fiber-reinforced composite materials in which a resin such as a thermoplastic resin, and the like and fiber such as inorganic fiber, and the like are mixed have been used in various technical fields. In general, fiber-reinforced composite materials are manufactured using the method of extrusion or wet impregnation. For instance, when a fiber-reinforced composite material is manufactured using the extrusion method, a compatibilizer is necessarily added because compatibility between a resin and fiber is important. When a compatibilizer is not added, layers of a resin and fiber are separated at the time of extrusion, and physical properties of a fiber-reinforced composite material that is finally manufactured are degraded. When a fiber-reinforced composite material is manufactured using the wet impregnation method, a solvent type resin is impregnated into fiber. However, most solvents are expensive, toxic and harmful to the human body and the environment and have to be withdrawn for reuse and disposal. Therefore, there is a need to develop a composite material that causes no harm to the human body and the environment, improves various physical properties, increase efficiency of processing and is economical.

DISCLOSURE

Technical Problem

In one embodiment of the present disclosure, a thermoplastic composite material is provided which has excellent flame retardancy and strength and has uniform physical properties as a whole.

In another embodiment of the present disclosure, a method for manufacturing a thermoplastic composite material is provided which is time-efficient, cost-efficient and environmentally friendly and causes no harm to the human body.

In yet another embodiment of the present disclosure, a panel is provided which is made from the thermoplastic composite material and may be used for interior and exterior materials for a building, a vehicle, a filter, and the like and for a part, and the like for various purposes.

Technical Solution

In one embodiment of the present disclosure, a thermoplastic composite material is provided which includes a fiber structure having a network structure including one or more layers of fiber woven sheets; thermoplastic resin particles having particle diameters of 1 µm to 50 µm; and particulate flame retardants, wherein the thermoplastic resin particles and particulate flame retardants are impregnated into the fiber structure.

In another embodiment of the present disclosure, a method for manufacturing a thermoplastic composite material is provided which includes manufacturing a fiber structure having a network structure including one or more layers of fiber woven sheets; manufacturing thermoplastic resin particles having particle diameters of 1 µm to 50 µm; dry-mixing the thermoplastic resin particles and particulate flame retardants; and impregnating the mixed thermoplastic resin particles and particulate flame retardants into the fiber structure.

In yet another embodiment of the present disclosure, a panel including a thermo-compressed product of the thermoplastic composite material is provided.

Advantageous Effects

The thermoplastic composite material has excellent flame retardancy and strength and has uniform physical properties such as flame retardancy and strength as a whole.

The method for manufacturing a thermoplastic composite material is time-efficient, cost-efficient and environmentally friendly and causes no harm to the human body.

The panel is made from the thermoplastic composite material and may be used for interior and exterior materials for a building, a vehicle, a filter, and the like and for a part, and the like for various purposes.

BEST MODE

Figure 1:
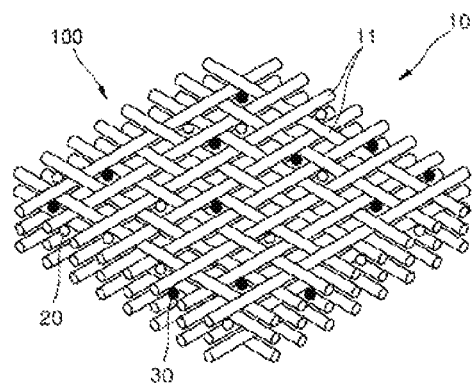
FIG. 1 is a schematic view illustrating a thermoplastic composite material according to one embodiment of the present disclosure.
Figure 2:
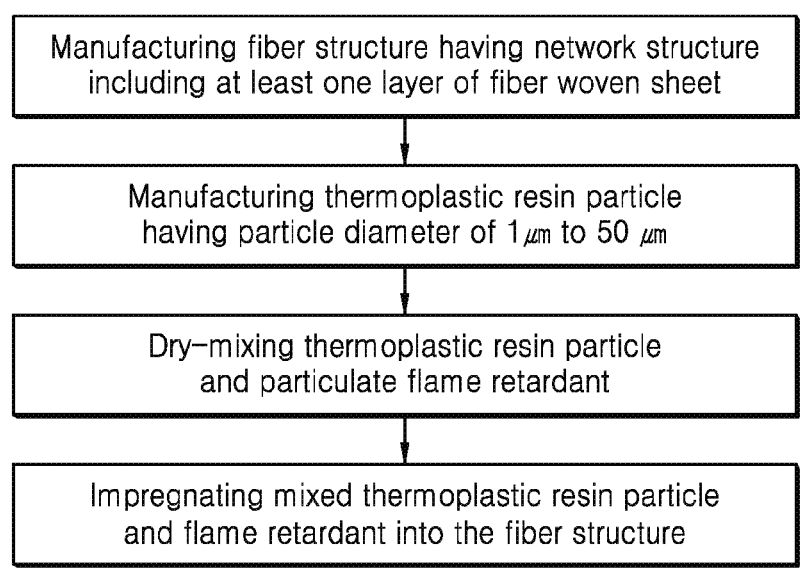
FIG. 2 is a flow chart illustrating a method for manufacturing a thermoplastic composite material according to one embodiment of the present disclosure.

Advantages and features of the present disclosure, and a method for implementing the advantages and features will be apparent from below-described embodiments. However, the present disclosure may be implemented in many different forms and should not be construed as being limited to the embodiments set forth herein. Rather, these embodiments are provided so that the present disclosure will be through and complete and so as to fully convey the scope of the present disclosure to one having ordinary skill in the art. The present disclosure will only be defined according to the appended claims. Throughout the specification, like reference numerals denote like elements.

In the drawings, thickness of layers and sections is exaggerated for clarity of description of the layers and sections. Additionally, in the drawings, thickness of some layers and sections is exaggerated for convenience of description.

Further, in this specification, when a part of a layer, a film, a section, a plate, and the like is referred to as being "on" another part or "in the upper portion" of another part, the part is "directly on" another part, and a third part is between the part and another part. On the contrary, when a part is referred to as being "directly on" another part, there is no third part between the part and another part. When a part of a layer, a film, a section, a plate, and the like is referred to as being "under" another part or "in the lower portion" of another part, the part is "directly under" another part, and a third part is between the part and another part. On the contrary, when a part is referred to as being "directly under" another part, there is no third part between the part and another part.

A thermoplastic composite material according to one embodiment of the present disclosure includes a fiber structure having a network structure including one or more layers of fiber woven sheets; thermoplastic resin particles having particle diameters of 1 μm to 50 μm; and particulate flame retardants, wherein the thermoplastic resin particles and the particulate flame retardants are impregnated into the fiber structure.

FIG. 1 is a schematic view illustrating a thermoplastic composite material 100 according to one embodiment of the present disclosure. Referring to FIG. 1, the thermoplastic composite material 100 includes a fiber structure having a network structure 10 including one or more layers of fiber woven sheets 11, and thermoplastic resin particles 20 and particulate flame retardants 30 that are impregnated into the fiber structure 10.

A particle diameter of the thermoplastic resin particle 20 may range from about 1 μm to about 50 μm and, specifically, from about 20 μm to about 50 μm and, more specifically, from about 30 μm to about 50 μm. Additionally, the thermoplastic resin particle may be a spherical particle having the above range of particle diameters. In this case, the term "spherical" does not denote a sphere that is shaped like a perfect ball mathematically or geometrically but should be understood as including a three-dimensional shape having any cross section that is substantially a circle.

The particle diameter of the thermoplastic resin particle 20 denotes an average diameter of the cross section of a particle and may be measured as a number average particle diameter through analysis of TEM/SEM images. The thermoplastic resin particle has a size smaller than a conventional thermoplastic resin particle and, with the above range of particle diameters, may be evenly dry-mixed with a particulate flame retardant. Accordingly, the melting-kneading method in which a solvent is used is not used, thereby making it possible to improve efficiency of processing and make processing eco-friendly.

The fiber structure 10 has a network structure consisting of one or more layers of fiber woven sheets 11. The term of network structure denotes a sparse structure where there is space between one strand of fiber and another strand of fiber and, specifically, denotes a structure that includes pores through which the thermoplastic resin particles and particulate flame retardants may pass.

The fiber structure having a network structure consisting of fiber woven sheets may include one or more layers of the fiber woven sheets, for instance, may include two or more layers of the fiber woven sheets, for instance, three to five layers of the fiber woven sheets, and, for instance, seven to fifteen layers of the fiber woven sheets, based on thickness of a final product.

One fiber woven sheet in the fiber structure has a structure where strands of fiber are woven, and, specifically, has a satin weave structure, a twill weave structure or a plain weave structure.

Additionally, the fiber woven sheet in which fiber is woven may include any one selected from a group consisting of glass fiber, cerakwool fiber, mineral fiber, carbon fiber and a combination thereof. When these sorts of fibers are used for the fiber woven sheet, material of fibers is compatible with material of the thermoplastic resin particles having the above-described size, and the thermoplastic resin particles may contribute to ensuring a desired level of flame retardancy together with the particulate flame retardant. Thus, the thermoplastic composite material may be applied to interior materials for a building, a vehicle, a filter, and the like or parts for various purposes.

An average diameter of a cross section of the fiber may range from about 5 μm to about 20 μm, and, specifically, from about 10 μm to about 20 μm and, more specifically, from about 15 μm to about 20 μm. An average diameter of the cross section of the fiber denotes a number average diameter of a cross section of the fiber that is cut in a direction perpendicular to the lengthwise direction of the fiber. When an average diameter of the cross section of the fiber is within the above range, the fiber may have proper thickness. Accordingly, a fiber structure consisting of a fiber woven sheet that is woven from the fiber may have a network structure into which the thermoplastic resin particles and particulate flame retardants may be properly impregnated. As a result, the thermoplastic composite material may have excellent durability, strength and flame retardancy.

Referring to FIG. 1, the thermoplastic composite material has a structure where the thermoplastic resin particles and particulate flame retardants are impregnated into the fiber structure. In this case, the thermoplastic resin particles and particulate flame retardants are dry-impregnated into the fiber structure.

Wet impregnation that is usually used is a method for manufacturing a resin and a flame retardant into a resin and a flame retardant that are melted or dispersed in a solvent and then impregnating the same into a fiber structure, with the method of melting and kneading, and the like. A usual solvent is a volatile compound that is harmful to the human body and the environment. Even a small amount of the solvent contained in a final product causes lower durability and strength of the product. Additionally, when a resin and a flame retardant are melted and kneaded, various additives are needed to improve miscibility, thereby leading to a decrease in efficiency of processing and an increase in manufacturing cost.

On the contrary, in the thermoplastic composite material according to one embodiment of the present disclosure, a particulate thermoplastic resin and a flame retardant are dry-mixed and dry-impregnated into the fiber structure having a network structure. Accordingly, the thermoplastic composite material may be stronger, more durable, more economical and more environmentally friendly than a thermoplastic composite material that is manufactured through wet impregnation.

When dry-mixed with the particulate flame retardant, the thermoplastic resin particle having the shape of a sphere, the particle diameter of which ranges from about 1 μm to about 50 μm, may be evenly mixed with the particulate flame retardant without an additive and may be successfully impregnated into a fiber structure having a network structure that consists of continuous fibers having a cross section, the average diameter of which ranges from about 15 μm to about 20 μm.

The thermoplastic resin particle may include any one selected from a group consisting of polypropylene, polystyrene, acrylonitrile butadiene styrene (ABS), polymethyl meta acrylate (PMMA), polyethylen glycol (PEG), thermoplastic poly urethane (TPU), polydimethylsiloxane (PDMS), high density polyethylene (HDPE), low density polyethylene (LDPE), high impact polystyrene (HIPS), poly lactic acid (PLA), polyethylene oxide (PEO) and a combination thereof.

When the thermoplastic resin particle consists of the above compounds, the thermoplastic resin particle may be easily formed into a sphere, the particle diameter of which ranges from about 1 μm to about 50 μm. Additionally, the thermoplastic resin particles are used with the above-described continuous fibers such that durability and strength of the thermoplastic composite material improve.

The thermoplastic composite material includes the thermoplastic resin particles and particulate flame retardants. The particulate flame retardants together with the thermoplastic resin particles are impregnated into the fiber structure while maintaining particle shapes.

The thermoplastic resin particles are not heat-stable. Accordingly, it is difficult to make the thermoplastic resin particles flame-retarded. Additionally, the fiber structure of the thermoplastic composite material includes continuous fibers. Accordingly, the fiber structure is easily burned because heat is delivered from the thermoplastic resin to the continuous fibers. Further, it is difficult to make the fiber structure flame-retarded because delivery of combustible materials is accelerated due to a continuous arrangement of the fiber.

The thermoplastic composite material according to one embodiment of the present disclosure includes the thermoplastic resin particles and particulate flame retardants, and, specifically, impregnates the thermoplastic resin particles and particulate flame retardants evenly into the fiber structure having a network structure, thereby excellently making the thermoplastic composite material flame-retarded.

A particle diameter of the particulate flame retardant may range from about 1 μm to about 10 μm, for instance, from about 1 μm to about 5 μm and, for instance, from about 2 μm to about 3 μm. When the particulate flame retardant has the above range of particle diameters, the particulate flame retardants may be evenly mixed with the thermoplastic resin particles and may be successfully impregnated into the fiber structure. Thus, the thermoplastic composite material may have a uniform flame-retardant property across the surface area.

Specific gravity of the particulate flame retardant may range from about 1 to about 3, for instance, from about 1 to about 2 and, for instance, from about 1 to about 1.5. When the particulate flame retardant having the above range of specific gravity is used, the particulate flame retardant may be easily dry-impregnated into the fiber structure. Additionally, the particulate flame retardant may be evenly distributed among polymers because the specific gravity of the particulate flame retardant is similar to that of polymer particles, thereby maximizing the flame-retardant effect.

The particulate flame retardant may be a non-halogen flame retardant and, for instance, may include a phosphorus-based flame retardant, a nitrogen-based flame retardant or a phosphorus and nitrogen-based flame retardant. In this case, a phosphorus and nitrogen-based flame retardant may be a physical mixture of a phosphorus-based flame retardant and a nitrogen-based flame retardant or a flame retardant that is formed by a chemical combination of a phosphorus-based compound and a nitrogen-based compound.

With these sorts of particulate flame retardants, the thermoplastic composite material may have improved resistance against flame, coloring and gasoline, may be evenly dry-mixed with the thermoplastic resin particles and may be easily controlled to have the above range of particle diameters and specific gravity.

The thermoplastic composite material may include about 20 to about 30 parts by weight of the particulate flame retardant with respect to 100 parts by weight of the thermoplastic resin particle and, for instance, include about 25 to about 30 parts by weight of the particulate flame retardant with respect to 100 parts by weight of the thermoplastic resin particle. When the content of the particulate flame retardant and the thermoplastic resin particle is within the above range of weight ratios, the particulate flame retardant and the thermoplastic resin particle are evenly dry-mixed with each other, and the thermoplastic composite material may meet a standard of flame retardancy for a building, a vehicle, and the like.

In another embodiment of the present disclosure, a method for manufacturing a thermoplastic composite material is provided. The method for manufacturing a thermoplastic composite material includes manufacturing a fiber structure having a network structure including one or more layers of fiber woven sheets; manufacturing a thermoplastic resin particle having particle diameters of 1 μm to 50 μm; dry-mixing the thermoplastic resin particle and a particulate flame retardant; and impregnating the mixed thermoplastic resin particle and particulate flame retardant into the fiber structure.

With the method for manufacturing a thermoplastic composite material, a thermoplastic composite material may be manufactured which includes a fiber structure having a network structure including one or more layers of fiber woven sheets; a thermoplastic resin particle having particle diameters of 1 μm to 50 μm; and a particulate flame retardant and which has a structure where the thermoplastic resin particle and the particulate flame retardant are impregnated into the fiber structure.

In the method for manufacturing a thermoplastic composite material, the fiber woven sheet is manufactured by weaving any one selected from a group consisting of glass fiber, cerakwool fiber, mineral fiber, carbon fiber and a combination thereof.

The fiber woven sheet may be manufactured by weaving the fibers into a satin weave structure, a twill weave structure or a plain weave structure. When the thermoplastic composite material includes two or more layers of fiber woven sheets, each of the fiber woven sheets may have the same weave structure or have different weave structures.

Additionally, the fiber structure having a network structure may be manufactured by stacking a plurality of fiber woven sheets, for instance, isotropically, orthogonally, asymmetrically and orthogonally, and asymmetrically.

In this case, isotropic stacking denotes stacking a plurality of fiber woven sheets such that the fibers of the fiber woven sheets have the same orientation, orthogonal stacking denotes alternately stacking a plurality of fiber woven sheets such that the fibers of the fiber woven sheets go across one another, asymmetrical and orthogonal stacking denotes stacking a plurality of fiber woven sheets such that the fibers of the fiber woven sheets go across one another and are stacked randomly, and asymmetrical stacking denotes alternately or randomly stacking a plurality of fiber woven sheets such the fibers of the fiber woven sheets do not go across one another but have a predetermined angle.

On the basis of weave structures and a combination thereof of the fiber woven sheets, network structures of the fiber structure differ, and structures of pores into which the thermoplastic resin particles and particulate flame retardants may be impregnated differ.

In one embodiment, the fiber structure having a network structure may be manufactured by alternately stacking a satin-weave or twill-weave fiber woven sheet and a plain-weave fiber woven sheet.

In another embodiment, the fiber structure having a network structure may be manufactured by orthogonally stacking a plurality of twill-weave fiber woven sheets.

The method for manufacturing a thermoplastic composite material includes manufacturing a thermoplastic resin particle having particle diameters of 1 μm to 50 μm. The thermoplastic resin particle may be manufactured from thermoplastic resin materials into a sphere having the above range of particle diameters.

The step of manufacturing a thermoplastic resin particle having particle diameters of 1 μm to 50 μm may include inserting a thermoplastic resin into an extruder; forming melted thermoplastic resin spray liquid from the thermoplastic resin; and obtaining a thermoplastic resin particle having particle diameters of 1 μm to 50 μm while spraying the melted thermoplastic resin spray liquid through a spraying nozzle and simultaneously cooling the same.

In the step of inserting a thermoplastic resin into an extruder, a thermoplastic resin material to be inserted into an extruder is not restricted but, for instance, may be a pellet-shaped thermoplastic resin. A pellet-shaped thermoplastic resin is an amorphous grain-shaped thermoplastic resin having maximum sizes of about 1 mm to about 5 mm. A thermoplastic resin particle having particle diameters of 1 μm to 50 μm may be obtained through follow-up steps after the pellet-shaped thermoplastic resin is inserted into an extruder.

The thermoplastic resin inserted into the extruder may be melted and manufactured as melted thermoplastic resin spray liquid.

The step of forming melted thermoplastic resin spray liquid from the thermoplastic resin may include transferring the thermoplastic resin to a spraying nozzle; and heating the thermoplastic resin in the spraying nozzle and forming melted thermoplastic resin spray liquid. That is, the thermoplastic resin material inserted into the extruder may be transferred to a spraying nozzle, melted in the spraying nozzle of high-temperature and manufactured as melted thermoplastic resin spray liquid.

In this case, the spraying nozzle may have temperatures of about 200° C. to about 400° C. At the above range of temperatures, a thermoplastic resin material may be melted in the spraying nozzle and manufactured as melted thermoplastic resin spray liquid having proper viscosity.

The melted thermoplastic resin sprayed liquid may have viscosity ranging from about 10 Pa·s to about $10^4$ Pa·s and, for instance, from about 10 Pa·s to about $10^2$ Pa·s at temperatures of about 100° C. to about 300° C. When the melted thermoplastic resin spray liquid has the above range of viscosity, the melted thermoplastic resin spray liquid may have proper flowability and may be sprayed as a droplet having particle diameters of about 1 μm to about 50 μm through the spraying nozzle.

The viscosity of the melted thermoplastic resin spray liquid may be adjusted based on sorts of thermoplastic resin materials, temperature of the spraying nozzle, and the like. For instance, the viscosity of the melted thermoplastic resin spray liquid may be adjusted by adding an adequate amount of any one selected from a group consisting of a lubricant, a plasticizer, wax, an antioxidant and a combination thereof.

The melted thermoplastic resin spray liquid may be formed into thermoplastic resin particles having particle diameters of about 1 μm to about 50 μm while being sprayed through the spraying nozzle and simultaneously cooled. That is, the melted thermoplastic resin spray liquid is sprayed in the form of a high-temperature droplet through the spraying line, and spraying is done in a cooling chamber. The droplets are cooled at the same time as the melted thermoplastic resin spray liquid is sprayed. Thus, minute thermoplastic resin particles having particle diameters of about 1 μm to about 50 μm may be obtained.

Specifically, the melted thermoplastic resin spray liquid may be injected into the spraying nozzle together with air. The temperature, pressure of the air that is injected together with the melted thermoplastic resin spray liquid, and the speed at which the air is injected may be adjusted so as to adjust the size and shape of droplets after the melted thermoplastic resin spray liquid is sprayed.

The temperatures of the air that is injected together with the melted thermoplastic resin spray liquid may be about 200° C. to about 500° C., and for instance, about 250° C. to about 450° C.

Additionally, the pressures of the air may be about 1 psi to about 145 psi, and for instance, about 5 psi to about 60 psi.

The speeds at which the air is injected may be about 1 m/s to about 100 m/s, and for instance, about 10 m/s to about 90 m/s.

When the air has the above range of temperatures, pressures and speeds, minute thermoplastic resin particles that will be finally formed may be manufactured from the melted thermoplastic resin spray liquid and may have a uniform particle size distribution.

Diameters of the spraying nozzle may be about 0.5 mm to about 10 mm, and for instance, about 1 mm to about 5 mm. When the spraying nozzle has the above range of diameters, thermoplastic resin particles having the above range of particle diameters may be easily manufactured, and efficiency of the process of discharging particles may improve.

The thermoplastic resin spray liquid may be sprayed through the spraying nozzle into a cooling chamber of about −30° C. to about 30° C. and, at the same time, may be cooled. With the cooling chamber having the above range of temperatures, the thermoplastic resin spray liquid may be sprayed and, at the same time, may be cooled. Accordingly, thermoplastic resin particles that have the above range of particle diameters and that have a uniform particle size distribution may be manufactured, and collection efficiency of particles may improve.

As a result, thermoplastic resin particles having particle diameters of about 1 μm to about 50 μm may be discharged.

The method for manufacturing a thermoplastic composite material includes dry-mixing the manufactured thermoplastic resin particle and a particulate flame retardant. The thermoplastic resin particle may be evenly mixed with the particulate flame retardant through the process of dry mixing because the thermoplastic resin particles are manufactured to have particle diameters of 1 μm to 50 μm.

For instance, the melting and kneading method has to be used to mix flame retardants and thermoplastic resins having particles that are relatively large and that have irregular shapes such as a pellet shape. Additionally, in the melting and kneading process, various additives are needed to improve miscibility. Solvents that are used in the melting and kneading process are expensive and necessarily withdrawn for reuse or disposal. Additionally, even a small amount of solvent that is left is harmful to the human body and the environment.

In the method for manufacturing a thermoplastic composite material, the thermoplastic resin particles and particulate flame retardants are dry-mixed without a solvent or an additive. With the process of dry mixing, the thermoplastic resin particles and particulate flame retardants may be evenly mixed. Additionally, the process of dry mixing has no harmful effect on the environment and saves time and cost.

Specifically, the thermoplastic resin particles and particulate flame retardants may be mixed through the process of ball-milling.

The dry-mixed thermoplastic resin particles and particulate flame retardants are impregnated into the fiber structure. In this case, a method for impregnating the thermoplastic resin particles and particulate flame retardants into the fiber structure includes dispersing the mixed thermoplastic resin particles and particulate flame retardants on the fiber structure and allowing the same into meshes of the network structure of the fiber structure.

As a result, a thermoplastic composite material may be manufactured which has a fiber structure having a network structure including one or more layers of fiber woven sheets and which has a structure where thermoplastic resin particles having particle diameters of 1 µm to 50 µm; and particulate flame retardants are impregnated in the fiber structure.

In yet another embodiment of the present disclosure, a panel including a thermo-compressed product of the thermoplastic composite material is provided.

The thermoplastic composite material includes a fiber structure having a network structure including one or more layers of fiber woven sheets; thermoplastic resin particles having particle diameters of 1 µm to 50 µm; and particulate flame retardants, the thermoplastic resin particles and particulate flame retardants are impregnated into the fiber structure, and the panel may be manufactured by thermally compressing the thermoplastic composite material.

Specifically, a thermo-compressed product of the thermoplastic composite material may be manufactured at temperatures of about 180° C. to about 220° C. at pressures of about 1 ton to about 7 ton.

When the thermoplastic composite material is thermally compressed in the above range of temperatures and pressures, the fiber structure may be properly compressed, and the thermoplastic resin particles may be sufficiently melted and excellently serve as a binding agent between fibers of the fiber structure.

Additionally, the thermoplastic composite material may be thermally compressed in the above range of temperatures and pressures for about 20 to about 30 minutes. Thus, the thermoplastic resin particles may serve as a binding agent while physical properties of the particulate flame retardants are not degraded.

The panel may be used for various objects including a building, a vehicle, a filter, and the like. Additionally, the panel may have uniform physical properties such as durability and flame retardancy across the surface area because the panel is manufactured from the thermoplastic composite material.

Below, specific embodiments of the present disclosure will be described. However, the embodiments are provided only as examples to describe the present disclosure. Therefore, the present disclosure should not be limited to the embodiments.

Embodiment and Comparative Example

Embodiment 1

A glass fiber woven sheet with a twill weave structure was manufactured using glass fiber having a cross section, the average diameter of which ranged from 10 µm to 20 µm, and a fiber structure having a network structure was manufactured by stacking seven layers of the glass fiber woven sheets orthogonally.

A polypropylene resin material that had the shape of a pellet with a maximum particle size of 3 mm was inserted into an extruder and was transferred to a spraying nozzle of 250° C., and then melted polypropylene resin spray liquid was manufactured. Next, the melted polypropylene resin spray liquid was injected into a spraying nozzle having a diameter of 1 mm and pressure 140 psi together with air. The air had a temperature of 400° C. and a pressure of 600 psi and was injected at a speed of 35 m/s. The melted propylene resin spray liquid was sprayed into a cooling chamber of 25° C. and cooled at the same and then manufactured into propylene resin particles having a particle diameter of about 10 µm.

Next, 30 parts by weight of phosphorus and nitrogen-based complex flame retardants having particle diameters of 2 µm to 3 µm and specific gravity of 1.35, as a particulate flame retardant, were dry-mixed with respect to 100 parts by weight of the manufactured propylene resin particles, using the ball-milling method.

The mixed propylene resin particles and particulate flame retardants were dispersed on the fiber structure having a network structure and impregnated into meshes of the network structure, and then a thermoplastic composite material was manufactured.

Embodiment 2

A thermoplastic composite material was manufactured using the same method as that of embodiment 1 except that a phosphorus-based flame retardants having particle diameters of 5 µm to 10 µm and specific gravity of 1.8 were used as a particulate flame retardant.

Comparative Example 1

A thermoplastic composite material was manufactured using the same method as that of embodiment 1 except that polypropylene resin particles that were manufactured by freeze-grinding a polypropylene resin material having the shape of a pellet with a maximum particle size of 3 mm and that had a particle diameter of more than 50 µm were used as a thermoplastic resin particle.

<Estimation>

Each of the thermoplastic composite materials of embodiments 1 to 2, and comparative example 1 was thermally compressed at temperatures of 180° C. to 220° C., at pressures of 1 ton to 7 ton, for 20 to 30 minutes, and then a panel was manufactured.

Estimated physical properties of the panel are described as follows.

Experimental Example 1: Flame Retardancy

In relation to the panel manufactured from the thermoplastic composite materials of embodiments 1 to 2, and comparative example 1, samples of 125 mm×13 mm×20 mm (length×width×thickness) with a bar shape were prepared. Next, one end of each of the samples in the lengthwise direction thereof was fixed by a clamp and then absorbent cotton was put at the lower end of the fixed samples. Next, flame retardancy of the samples was estimated using UL 94 V Test (vertical burning test) that is described below. Table 2 shows flame retardancy rated based on the standards in table 1.

<UL 94 V Test>

After the samples primarily contacted flame with a length of 20 mm for 10 seconds, burning time (t1) of the samples was measured, and burning conditions of the samples were recorded.

Then the burning of the samples finished following the primary contact with the flame. After the samples secondarily contacted flame for ten seconds again, burning time (t2) and glowing time (t3) of the samples were measured, and burning conditions of the samples were recorded.

The samples were rated based on burning time (t1, t2 and t3) and burning conditions (burning of the clamp, ignition of the absorbent cotton caused by a drop) in accordance with the following standards. In this case, "burning of the clamp" indicates whether the clamps were burned out after each of the samples was burned out, and "ignition of the absorbent cotton caused by a drop" indicates whether flame was dropped onto the absorbent cotton at the lower end of the fixed samples, and the absorbent cotton was ignited, after each of the samples and the clamp were burned out.

TABLE 1

| Grade | V-0 | V-1 | V-2 |
|---|---|---|---|
| Each burning time (t1 or t2) | ≤10 sec | ≤30 sec | ≤30 sec |
| Total burning time (t1 + t2) | ≤50 sec | ≤250 sec | ≤250 sec |
| Burning time and glowing time after secondary contact with flame (t2 + t3) | ≤30 sec | ≤60 sec | ≤60 sec |
| Burning of clamp (125 mm) | × | × | × |
| Ignition of absorbent cotton caused by drop | × | × | ○ |

TABLE 2

| | Estimation of flame retardancy |
|---|---|
| Embodiment 1 | V-1 |
| Embodiment 2 | V-2 |
| Comparative example 1 | Out of grade |

Table 2 shows that panels that were manufactured by thermally compressing the thermoplastic composite materials of embodiments 1 and 2 had flame retardancy higher than a panel that was manufactured by thermally compressing the thermoplastic composite material of comparative example 1.

The invention claimed is:

1. A method for manufacturing a thermoplastic composite material, comprising:
    manufacturing a fiber structure, wherein the fiber structure comprises a network and stacked structure comprises a fiber woven sheet, the fiber woven sheet consists of a continuous fiber, and an average diameter of a cross section of the continuous fiber ranges from 15 μm to 20 μm;
    manufacturing a thermoplastic resin particle having particle diameters of 1 μm to 50 μm;
    dry-mixing the thermoplastic resin particle and a particulate flame retardant, wherein an amount of the particulate flame retardant ranges from 20 parts by weight to 30 parts by weight based on 100 parts by weight of the thermoplastic resin particle, a particle diameter of the particulate flame retardant ranges from 1 μm to 10 μm, a specific gravity of the particulate flame retardant ranges from 1 to 3, and the dry-mixing is carried out using a ball-milling method; and
    impregnating the mixed thermoplastic resin particle and particulate flame retardant into the fiber structure, comprising:
        dispersing the thermoplastic resin particle and the particulate flame retardant on the fiber structure, and
        allowing the thermoplastic resin particle and the particulate flame retardant into meshes of the network structure of the fiber structure.

2. The method for manufacturing a thermoplastic composite material of claim 1, the step of manufacturing a thermoplastic resin particle having particle diameters of 1 μm to 50 μm, comprising:
    inserting a thermoplastic resin into an extruder;
    forming melted thermoplastic resin spray liquid from the thermoplastic resin; and
    obtaining a thermoplastic resin particle having particle diameters of 1 μm to 50 μm by spraying the melted thermoplastic resin spray liquid through a spraying nozzle and simultaneously cooling the same.

3. The method for manufacturing a thermoplastic composite material of claim 2, the step of forming melted thermoplastic resin spray liquid from the thermoplastic resin, comprising:
    transferring the thermoplastic resin to a spraying nozzle; and
    heating the thermoplastic resin in the spraying nozzle and forming melted thermoplastic resin spray liquid.

4. The method for manufacturing a thermoplastic composite material of claim 2, wherein the melted thermoplastic resin spray liquid is injected into the spraying nozzle together with air, and a speed at which the air is injected ranges from 1 m/s to 100 m/s.

* * * * *